No. 694,069. Patented Feb. 25, 1902.
F. J. NOECHEL.
FEED MECHANISM FOR GRAIN DRILLS.
(Application filed Apr. 6, 1901.)
(No Model.) 2 Sheets—Sheet 1.
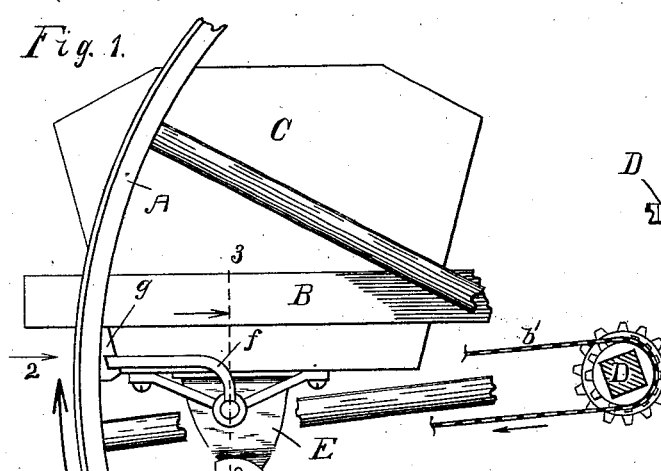
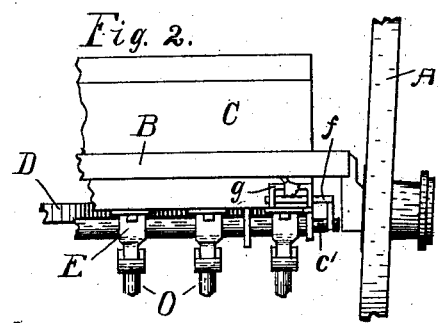
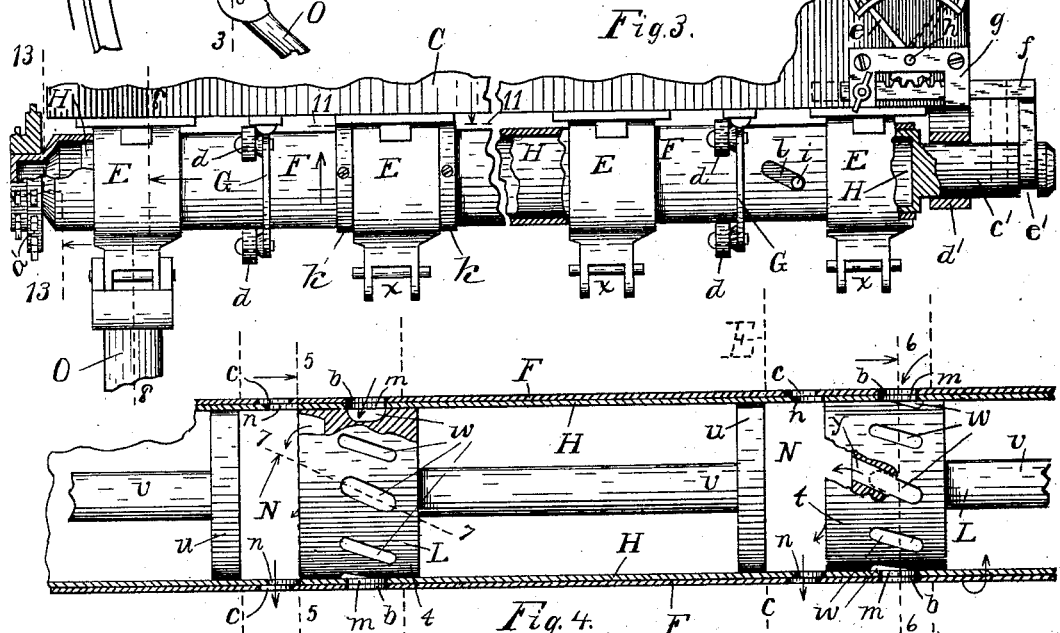
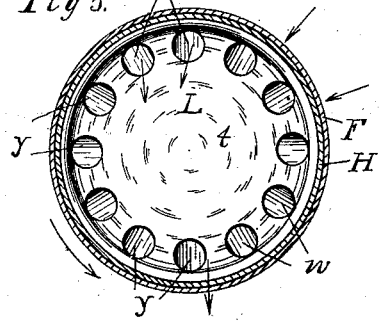
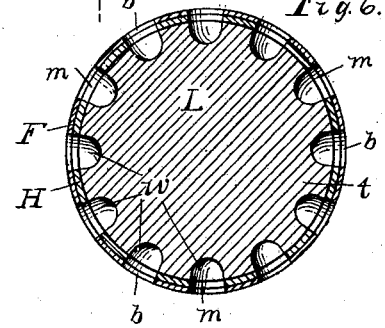
Attest:
M. B. Smith
M. D. Phillips
Inventor:
F. J. Noechel.
By E. B. Whitmore, Atty.
THE NORRIS PETERS CO., PHOTO-LITHO., WASHINGTON, D. C.

No. 694,069. Patented Feb. 25, 1902.
F. J. NOECHEL.
FEED MECHANISM FOR GRAIN DRILLS.
(Application filed Apr. 8, 1901.)
(No Model.) 2 Sheets—Sheet 2.

Attest
M. B. Smith
M. D. Phillips.

Inventor
F. J. Noechel,
By C. B. Whitmore, Atty.

THE NORRIS PETERS CO., PHOTO-LITHO., WASHINGTON, D. C.

UNITED STATES PATENT OFFICE.

FRANK J. NOECHEL, OF ROCHESTER, NEW YORK.

FEED MECHANISM FOR GRAIN-DRILLS.

SPECIFICATION forming part of Letters Patent No. 694,069, dated February 25, 1902.

Application filed April 6, 1901. Serial No. 54,617. (No model.)

*To all whom it may concern:*

Be it known that I, FRANK J. NOECHEL, of Rochester, in the county of Monroe and State of New York, have invented a new and useful Improvement in Feed Mechanism for Grain-Drills, which improvement is fully set forth in the following specification and shown in the accompanying drawings.

This invention is a feed device for grain-drills, the same being hereinafter fully described, and more particularly pointed out in the claims.

In using grain-drills difficulty has been frequently experienced in the matter of controlling the feed so as to deliver the seed uniformly upon the ground as the machine moves along, and to overcome this difficulty by devising improved means by which uniform amounts or measures of grain or seed may be conveyed to the drill-teeth while the machine progresses to insure a uniform and even seeding of the ground is the main object of my present invention.

Figure 8:
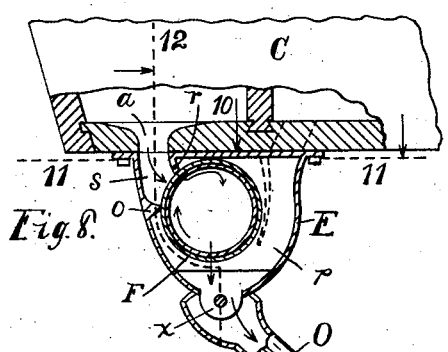
Figure 9:
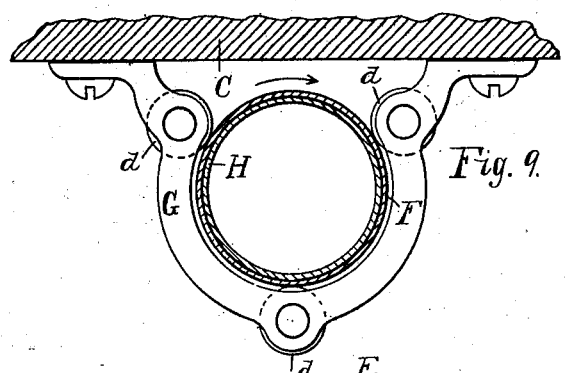
Figure 10:
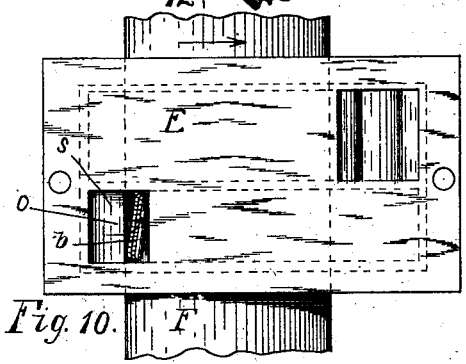
Figure 11:
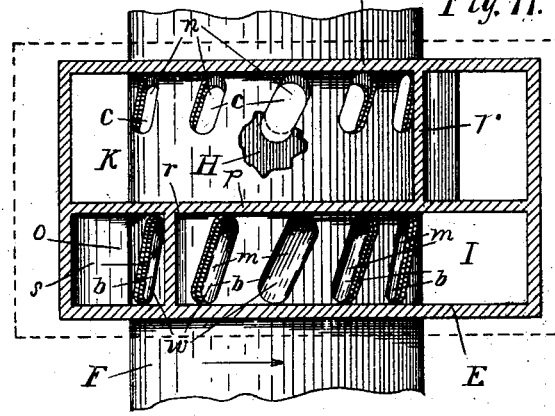
Figure 14:
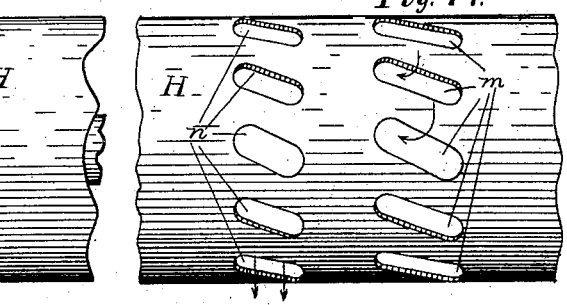
Figures 12, 13:
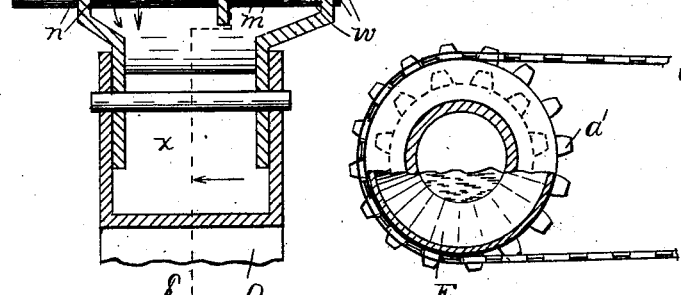

Referring to the drawings, Figure 1 is an end elevation of parts of a grain-drill with my improved feed device attached. Fig. 2 is a rear elevation of the same seen as indicated by arrow 2 in Fig. 1, mainly broken away. Fig. 3 is a rear elevation of parts of the feed mechanism, parts being broken away and omitted and other parts sectioned as on the vertical dotted line 3 3 in Fig. 1. Fig. 4 is a longitudinal section of the feed-cylinders, taken as on the dotted line 3 3 in Fig. 1, parts being broken away. Fig. 5 is a transverse section of the feed-cylinders on the dotted line 5 5 in Fig. 4, showing the head of a core-piece. Fig. 6 is a transverse section of the feed-cylinders on the dotted line 6 6 in Fig. 4, showing the forms of the seed-cups. Fig. 7 is a section of a part of the head of a core-piece, taken on the inclined dotted line 7 7 in Fig. 4, further showing the form of a seed-cup. Fig. 8 is a vertical transverse section of the feed-cylinders and associated parts, taken on the broken dotted lines 8 8 in Figs. 3 and 12, further showing the forms and relation of the associated parts, parts being broken away. Fig. 9 is a vertical cross-section of the feed-cylinders, showing a support or carrier for the same. Fig. 10 is a view of the upper face of a feed-cup seen as indicated by arrow 10 in Fig. 8. Fig. 11 is a horizontal section of a feed-cup, taken on the dotted line 11 11 in Fig. 8, showing the interior of the cup. Fig. 12 is a section of a feed-cup, taken as on the broken dotted line 12 12 in Fig. 8, further showing the interior of the cup. Fig. 13 is a vertical transverse section of the axle and the outer feed-cylinder, taken as on the broken dotted line 13 13 in Fig. 3, showing a manner of revolving the cylinders, parts being broken out. Fig. 14 is an elevation of a part of the inner feed-cylinder, showing the openings therein. Fig. 1 is drawn to a scale about one-sixth full size, Fig. 2 to a scale about one-twelfth size, Figs. 3 and 8 to a scale about one-fourth size; Figs. 5, 6, 7, 11, 12, and 14 to a scale about three-fourths size, and Figs. 4, 9, 10, and 13 to a scale about one-half size.

In the drawings, A represents the carrying-wheels, B the frame, C the seedbox, and D the axle, of a grain-drill, all substantially of common construction.

E, Figs. 1, 2, 3, and 8, represents a series of feed-cups in a line under the seedbox and secured thereto, the latter having a row of openings $a$, Figs. 8 and 12, communicating between the interior of the seedbox and the spaces within the respective cups. The latter are pierced or traversed by a horizontal feed-cylinder F, Figs. 1, 2, 3, and 8, to control the outflow of the seed or grain from the box C in the act of feeding, said cylinder crossing the spaces within the cups, as shown in Figs. 11 and 12. The feed-cylinder is formed with two circumferential series of spiral openings $b\,c$ within each cup E, as shown in Figs. 4, 11, and 12, said cylinder being supported in place by hangers G, Figs. 3 and 9, secured to the seedbox C, the cylinder resting against rollers $d$ in the hangers. Within the cylinder F is a similar cylinder H, Figs. 3 to 6, controlled by a bent toothed arm $f$, Figs. 1, 2, and 3, actuated by a toothed lever $e$, pivoted on a bearing $h$ in a bracket $g$, secured to the rear surface of the seedbox. The projecting end $c'$ of this cylinder is reduced in diameter, as shown, and held in a hanger $d'$, secured to the seedbox C, the arm $f$ engaging in a groove $e'$ in the part $c'$. By turning the lever $e$ one way or the other the inner cylinder H will be caused to move endwise within the outer cylinder F, the latter being held from partaking of said motions by means of a pair of collars or rings *k k*, rigid with the cylinder F on the opposite sides of a feed-cup E. To control these motions of the cylinder H, the latter is provided with a rigid pin *i*, Fig. 3, occupying an inclined or spiral slot *l* in the cylinder F, the spirality of said slot corresponding with that of the openings *b* and *c* in said latter cylinder. The inner cylinder H is also formed with two circumferential series of openings *m n*, Figs. 4, 12, and 14, corresponding in size and form with the openings *b c* and registering therewith, which openings *b m* and *c n* through the outer and the inner cylinders constituting continuous passages communicating between the spaces within the feed-cups and the interior space of the inner cylinder.

The interiors of the feed-cups E are divided by vertical transverse partitions *p*, Figs. 8, 11, and 12, into apartments I and K, the openings *b* and *m*, which together constitute the inflow-passages for the seed through the cylinders, occupying the former apartments and the openings *c* and *n* together constituting the outflow-passages for the seed from the cylinders occupying the latter apartment, as shown. Each cup is further formed with an inwardly-projecting horizontal bar *o*, Figs. 8, 10, 11, and 12, crossing the apartment I and serving to deflect the inflowing seed against the side of the cylinder F and so through the openings *b* therein as the cylinder is revolved. A narrow cross wall or partition *r* is also formed in each cup, forming with the bar *o* and the opposing part of the outer wall of the cup a chamber *s*, constituting a duct or passage for the seed to the inflow-openings of the feed-cylinders.

Within the inner feed-cylinder H is rigidly fixed a series of wooden core-pieces L, Figs. 4 to 7, each having a head *t* at one end and a disk or diaphragm *u* at the opposite end, with an intervening reduced part *v*. The head *t* of each core-piece is formed with a series of inclined seed-pockets *w*, corresponding in form and size at their outer ends with the inflow-openings *m* in the cylinder H, the inner or outlet ends of which pockets being practically circular and opening into the space within said cylinder H, as shown. As constructed the diaphragm *u* of each core-piece is near the perforated head of the adjacent core-piece, inclosing between them a space N, a series of outlet-openings *n* and *c* communicating with said space. Furthermore, each cup E is formed with a discharge-opening *x*, Figs. 8 and 12, through its lower end, communicating with the adjacent conducting-pipe O for the seed, leading downward to a drill-tooth at the ground. (Not shown.) From this description of the parts it will be understood that there are passages, continuous except as to momentary interruptions at the pockets *w*, as stated, for the seed from the interior of the seedbox C through the series of openings *a* therein and the inflow-openings *b* and *m* in the feed-cylinders, thence through the seed-pockets *w* and the outflow-openings *n* and *c* in the cylinders, and the discharge-openings *x* of the cups into the conducting-pipes O.

It will be observed by viewing Figs. 4 and 12 that the slant or inclination of the seed-pockets *w* is forward or in the direction in which the feed-cylinders revolve—that is to say, the discharge ends *y*, Figs. 4, 5, and 7, of the pockets are in advance of the receiving ends of the pockets adjacent to the inflow-openings *m* of the cylinder H. On account of this slant given the seed-pockets when the grain or seed enters the latter through the inflow-openings in the feed-cylinders it does not flow directly into the inner space of the cylinder H, for when the pockets are receiving the seed from the chambers *s*, as stated, their discharge ends are higher than the receiving ends. The revolving cylinders first carry the filled pockets up over the highest part or top of the cylinders, after passing which the pockets pour their contents into the cylinder H. As will be seen by viewing Fig. 8, the pockets are above the middle of the cylinders or well toward the top of the latter, when they receive the seed and deliver it into the cylinder H only after their discharge ends pass the highest part of the cylinders, as stated. This form and arrangement of the parts prevents a stream or unchecked flow of seed at any time from the seedbox C through the pockets into the cylinder H, which would be objectionable, as such a flow of the seed would be liable to cause an uneven or irregular seeding of the ground. As the parts are constructed and arranged a brief interval of time elapses in each case between the filling or charging of the pockets and their discharge, which insures an even delivery of seed into the cylinder H and to the ground.

By adjusting the cylinder H in the outer cylinder F, as above stated, the capacity of the inflow-openings *b m* may be regulated to control the amounts of the seed that will flow into the pockets *w* as they pass the chambers *s*. This will be understood by viewing Figs. 3 and 12. When the inner cylinder H is drawn fully out to the right, the openings *b* and *m* in the respective cylinders will coincide or register, giving full capacity of openings for the flow of the seed into the pockets *w*; but when the said cylinder is moved inward, as indicated by dotted lines, the said openings will be partly closed on account of the lapping of the parts. The graduated arc *f'*, Fig. 3, at the point of the lever *e* indicates the relative position of the cylinder H in the outer cylinder F, and consequently the size or capacity of the inflow-openings for the seed. No seed can enter the inner cylinder and so pass to the ground except through the chambers *s*, these chambers being always filled with the seed when the machine is in use;

but any seed entering said inner cylinder may freely fall out of the discharge or outlet openings c and n at the lower side of the cylinders as the latter revolve, and so enter the pipes O.

The feed-cylinders F and H may be rotated by any convenient means, as by a sprocket z, Figs. 1 and 13, on the axle D of the drill with chain b', leading onto a sprocket a', Figs. 3 and 13, secured to the outer cylinder F. By employing sprockets of different diameters, as shown, the speed of the revolution of the cylinders may be varied to regulate the feed.

What I claim as my invention is—

1. In a grain-drill, a seedbox in combination with feed mechanism comprising a series of cups secured to the seedbox, with openings between the seedbox and the cups, and telescoping cylinders crossing the interiors of said cups, formed with openings constituting continuous passages to the interior of the cylinders, and means for moving the inner tube independently of the outer tube, and for turning the cylinders, substantially as and for the purpose specified.

2. The seedbox of a grain-drill, and feed-cups secured to the seedbox, openings in the latter communicating with the interiors of the cups, an outer and an inner cylinder crossing the spaces in the cups, there being elongated overlapping openings through the sides of the cylinders communicating with the interiors of the cups, and means for moving the inner cylinder longitudinally within the outer cylinder, and to rotate the cylinders, substantially as set forth.

3. The seedbox of a grain-drill, having outflow-openings, in combination with cups secured to the seedbox to cover the openings, a pair of telescoping cylinders crossing the interiors of the cups, formed with openings, there being continuous passages for the seed from the interior of the seedbox through said openings, and core-pieces in the inner cylinder, having cavities registering with the openings through said inner cylinder, and opening into the interior of the inner cylinder, substantially as and for the purpose specified.

4. In combination with the seedbox of a grain-drill, having outflow-openings for the grain or seed, cups to cover said openings through the seedbox, and telescoping cylinders piercing the cups, having series of inflow-openings and series of outflow-openings, and core-pieces in the inner cylinder, having cavities or pockets registering with the inflow-openings through said inner cylinder, leading into the space within the inner cylinder, substantially as shown and described.

5. In combination with the seedbox of a grain-drill, having outflow-openings, feed mechanism comprising cups for said openings, and telescoping cylinders piercing the cups, having series of inflow-openings and series of outflow-openings, and core-pieces in the inner cylinder each having a head formed with spiral cavities registering with the inflow-openings and leading into the interior of the inner cylinder, and a diaphragm, said outlet-openings being between the heads of the core-pieces and the opposing diaphragms, substantially as set forth and shown.

6. The seedbox of a grain-drill, formed with outflow-openings, and pendent cups to cover said openings, and telescoping cylinders piercing the cups, having inflow and outflow openings, and core-pieces in the inner cylinder having cavities or pockets for the seed, coacting with said inflow-openings, and means for revolving the cylinders, said pockets being inclined or slanting in the direction in which the cylinders are revolved, substantially as and for the purpose specified.

7. In combination with the seedbox of a grain-drill, having outflow-openings, cups covering said openings, and telescoping cylinders piercing the cups, having inflow and outflow openings arranged in circumferential series, partitions in the cups dividing the interiors into vertical apartments crossed by the feed-cylinders, a series of inflow-openings being in one apartment of a cup and a series of outflow-openings being in the other apartment of the cup, and means for turning the cylinders, substantially as set forth.

8. In combination with the seedbox of a grain-drill, formed with outflow-openings, cups covering said openings, and telescoping cylinders piercing the cups, having inflow and outflow openings in series, partitions in the cups dividing the interiors thereof into apartments crossed by the feed-cylinders, and feed-chambers in the cups, leading to the surface of the outer feed-cylinder, with means to rotate the feed-cylinders, substantially as shown and set forth.

9. Feed mechanism for a grain-drill, comprising, in combination with a seedbox, cups secured to the seedbox, and openings between the latter and the cups, telescoping feed-cylinders traversing the cups, having inflow-openings communicating with the interiors of the cups, and deflecting chambers or passages in the cups communicating with said openings in the cylinders above the middle line of the latter, and core-pieces in the inner cylinder, having inclined pockets communicating at their outer ends with said inflow-openings in the feed-cylinders, and at their inner ends with the space in the inner feed-cylinder, the inner end of each pocket being above the outer end when the inflow-opening leading to said pocket passes a deflecting-chamber, substantially as and for the purpose specified.

10. In combination with the seedbox of a grain-drill, formed with outflow-openings, a feed mechanism comprising cups secured to the seedbox, and revolving telescoping cylinders traversing the cups, having inflow and outflow openings, and core-pieces in the inner cylinder, each having a head formed with inclined or slanting pockets registering at their outer ends with the inflow-openings of the inner cylinder, the inner or discharge ends of the pockets leading into the space in the inner cylinder, said discharge ends of the pockets being in advance of the receiving ends as the cylinders are revolved, substantially as shown and described.

In witness whereof I have hereunto set my hand, this 25th day of March, 1901, in the presence of two subscribing witnesses.

FRANK J. NOECHEL.

Witnesses:
ENOS B. WHITMORE,
M. B. SMITH.